United States Patent [19]

Raidel

[11] 4,184,698
[45] Jan. 22, 1980

[54] MOUNTING STRUCTURE FOR VEHICLE SUSPENSIONS

[76] Inventor: John E. Raidel, Rte. 9, Box 400-M, Springfield, Mo. 65804

[21] Appl. No.: 887,209

[22] Filed: Mar. 16, 1978

[51] Int. Cl.$^2$ ................. B60G 19/02; B60G 15/00; B60G 5/04
[52] U.S. Cl. .................................. 280/686; 280/689
[58] Field of Search ............. 280/693, 713, 672, 686, 280/679, 688, 687; 267/15 R, 47, 67

[56] References Cited

U.S. PATENT DOCUMENTS

| | | | |
|---|---|---|---|
| 3,471,165 | 10/1969 | Raidel | 280/689 |
| 3,482,854 | 12/1969 | Masser | 280/713 |
| 3,614,123 | 10/1971 | Raidel | 280/686 |
| 3,625,538 | 12/1971 | Raidel | 280/686 |
| 3,632,128 | 1/1972 | Raidel | 280/688 |
| 3,751,063 | 8/1973 | Raidel | 280/688 |
| 3,801,086 | 4/1974 | Raidel | 267/67 |
| 3,912,294 | 10/1975 | Raidel | 280/679 |
| 3,960,388 | 6/1976 | Raidel | 280/623 |

Primary Examiner—Richard A. Bertsch
Attorney, Agent, or Firm—Rogers, Eilers & Howell

[57] ABSTRACT

A mounting structure for vehicle suspensions for adjustably mounting first and second members of the suspension including a pin extending through aligned openings in the first and second members. The openings in one of these members are greater in at least one dimension than the pin which may be released from a locking condition to allow the pin to slide within the opening in the direction of its larger dimension producing movement of one of the members relative to the other for purposes of providing axle alignment, adjustment of axle load distribution, and the like. The movement or positioning of the pin and hence the one member relative to the other is produced at least in part through rotation of a shank extending through said first and second members and having an eccentric shank portion engaging one of said first and second members, the operative engagement of the eccentric portion of the shank producing movement of one member relative to the other with corresponding guided movement of the pin within the enlarged opening.

10 Claims, 13 Drawing Figures

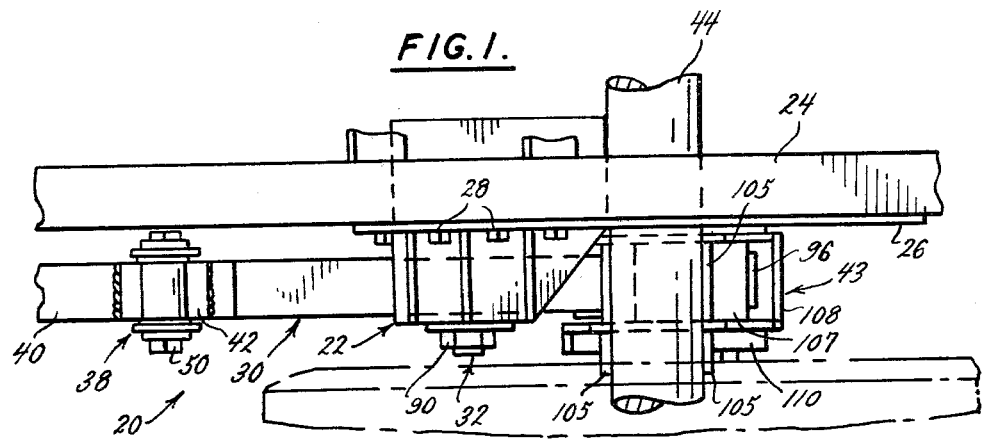
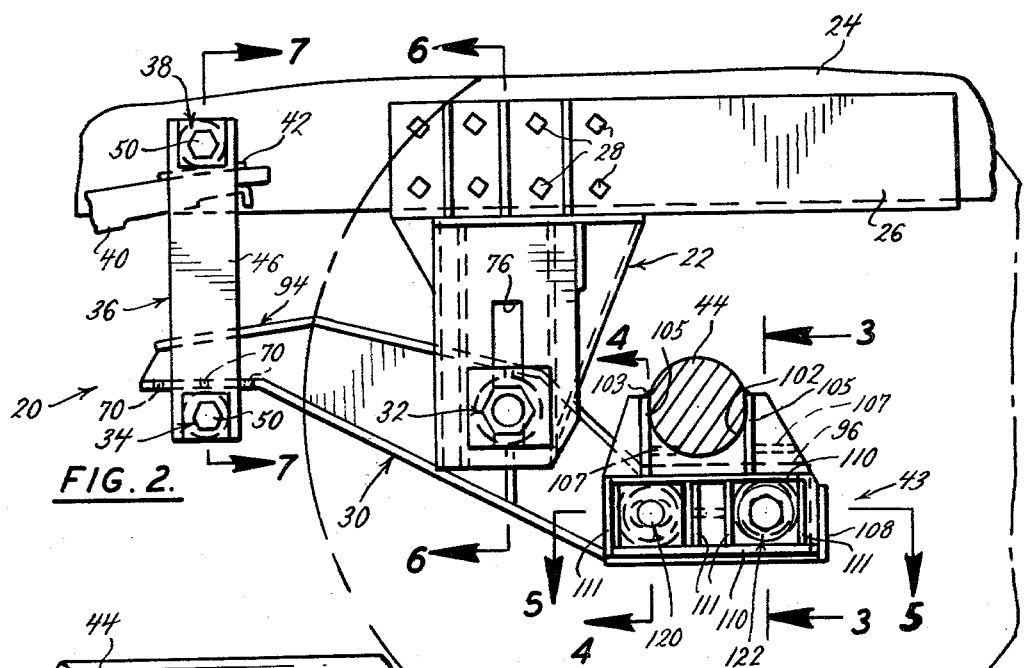
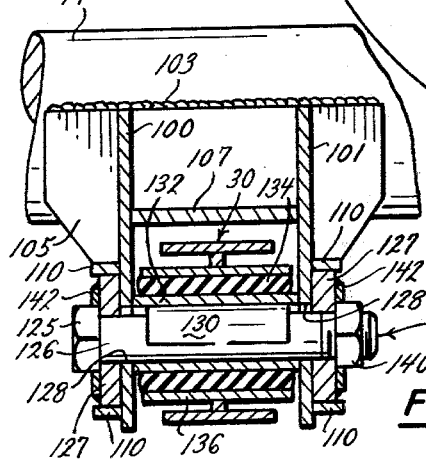
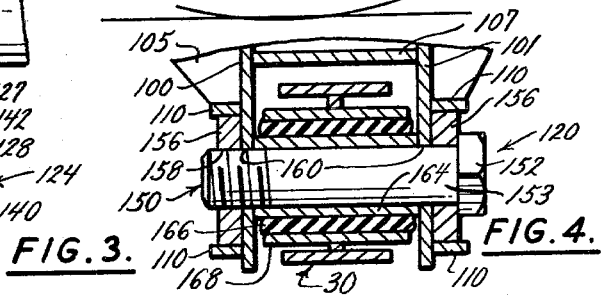

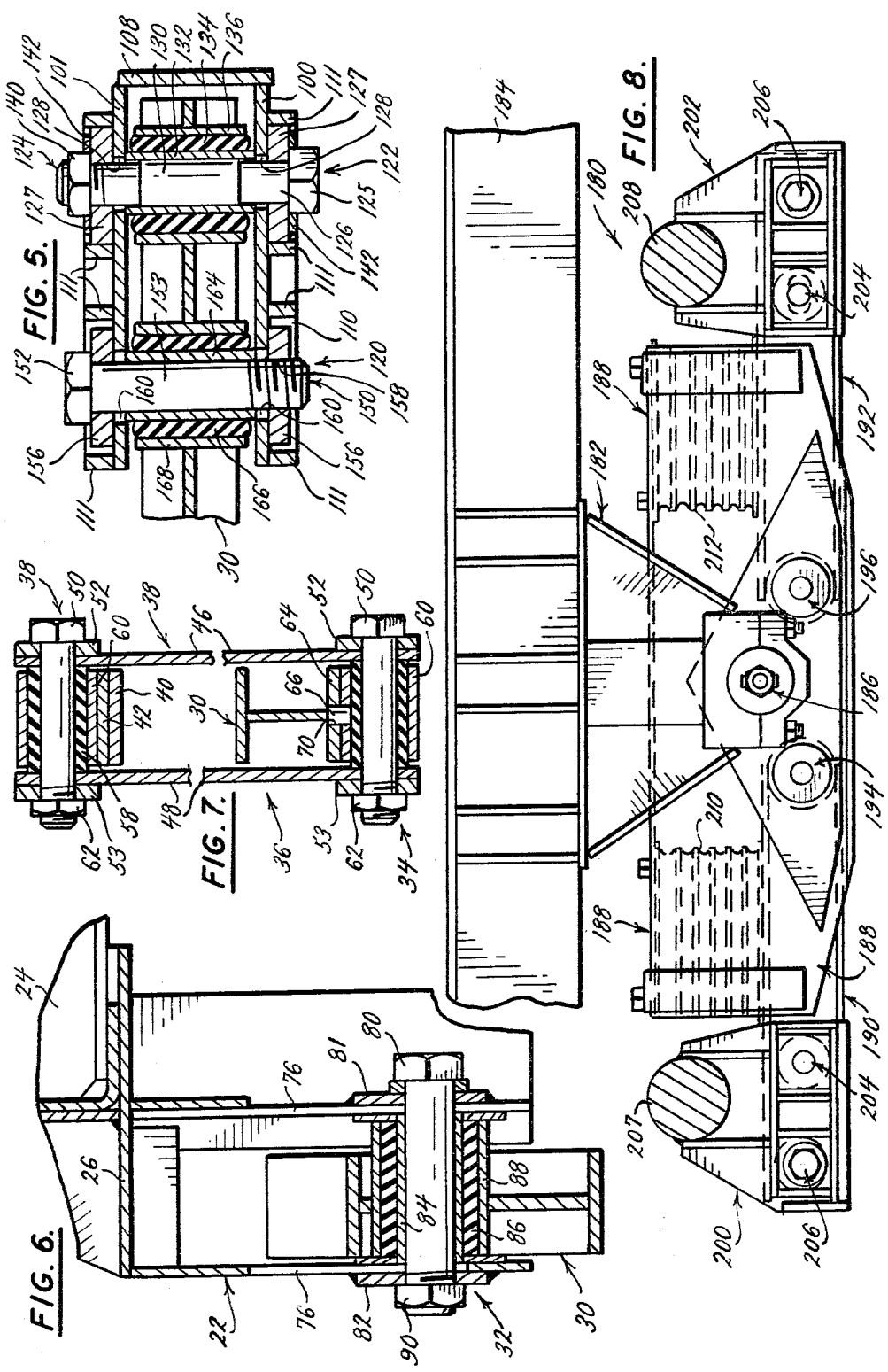

MOUNTING STRUCTURE FOR VEHICLE SUSPENSIONS

BACKGROUND AND SUMMARY OF THE INVENTION

This invention generally relates to a mounting structure for adjustably mounting members of a vehicle suspension assembly for purposes of providing axle alignment, selected axle load distribution, and the like. Various devices are known in the art for providing similar types of adjustment. One example of such adjustment is the use of an eccentric bushing of a type shown in applicant's Pat. Nos. 3,751,063, 3,912,294, 3,614,123, 3,625,538, and 3,801,086. Another example of such a device is the use of an elongated slot arrangement as shown by U.S. Pat. Nos. 3,482,854 to Masser and 3,960,388 to Strader, et al. A disadvantage of the elongated slot has been the need to lock the members in their adjusted position by means of a permanent weld making it difficult for the operator of the vehicle to make his own adjustments as may be necessary, for example, under varying load distribution conditions on a vehicle having multiple axles.

The adjustable mounting structure of the present invention provides both precise adjustment over a wide range together with the versatility that it can be used at the axle seat for aligning the axle while maintaining a rigid mounting structure for the axle, or for adjustment of load distribution between axles with a multiple axle vehicle, and provides the further versatility operator without the need for disassembling permanently welded members.

The present invention can be used with various types of suspension assemblies, as shown for example, generally by U.S. Pat. Nos. 3,471,165, 3,614,123, 3,632,128, 3,625,538, 3,751,063, and 3,912,294, all of which are incorporated herein by reference, and thus can be used with single axle, tandem axle, trailing axle, and triaxle suspensions. The mounting structure of this invention is for adjustably mounting two members of the suspension together, and may be used for mounting an axle seat to a member operatively connecting the axle seat to the chassis for generally up and down movement of the axle relative to the chassis upon loading and unloading the axle, or may be for pivotally connecting adjacent beam members of a triaxle suspension for purposes of adjustable load distribution between axles.

Generally, the present invention includes a pin extending through aligned openings in the members connected by the mounting structure. The openings in one of the members are greater in dimension in at least one transverse direction than the corresponding size dimension of the pin at the location of the enlarged openings. Means are provided for releasably locking or tightening the pin against transverse movement within the enlarged opening such that when the pin is released it may be moved within the enlarged opening in the direction of greater dimension and thereby move one of the members relative to the other to affect axle alignment, adjustment of axle load distribution, and the like.

This adjustment or movement may be provided with precision at least within certain limits through means having a shank extending through said members and having an eccentric shank portion that engages one of the members whereby rotation of the shank imparts precise movement of one of the members relative to the other as allowed by movement of the pin within the enlarged opening when the pin is in the unlocked condition. Means are also provided for releasably locking the eccentric shank against rotation.

In one embodiment of the invention, the pin itself includes the eccentric shank portion such that the adjacent members may be pivotally joined by the mounting structure of this invention. In another embodiment, the eccentric shank is included in a bushing assembly spaced from the pin and may be used to rigidly join two members together as may be desirable in mounting an axle seat to the vehicle suspension without the need of other members to stabilize the seat. These embodiments may also be combined as with a multiple axle suspension with the corresponding combined advantages of both.

DESCRIPTION OF THE DRAWINGS

FIG. 1 is a plan view of a trailing axle suspension assembly utilizing the mounting structure of the present invention;

FIG. 2 is a side elevation view of the suspension assembly of FIG. 1;

FIG. 3 is an enlarged view in section taken generally along the line 3—3 of FIG. 2;

FIG. 4 is an enlarged view in section taken generally along the line 4—4 of FIG. 2;

FIG. 5 is an enlarged view in section taken generally along the line 5—5 of FIG. 2;

FIG. 6 is an enlarged view in section taken generally along the line 6—6 of FIG. 2;

FIG. 7 is an enlarged view in section taken generally along the line 7—7 of FIG. 2;

FIG. 8 is a side elevation view of a tandem axle elastomeric type beam suspension assembly using the mounting structure of the present invention for mounting the axle seat;

DETAILED DESCRIPTION OF PREFERRED EMBODIMENTS

Figure 9:
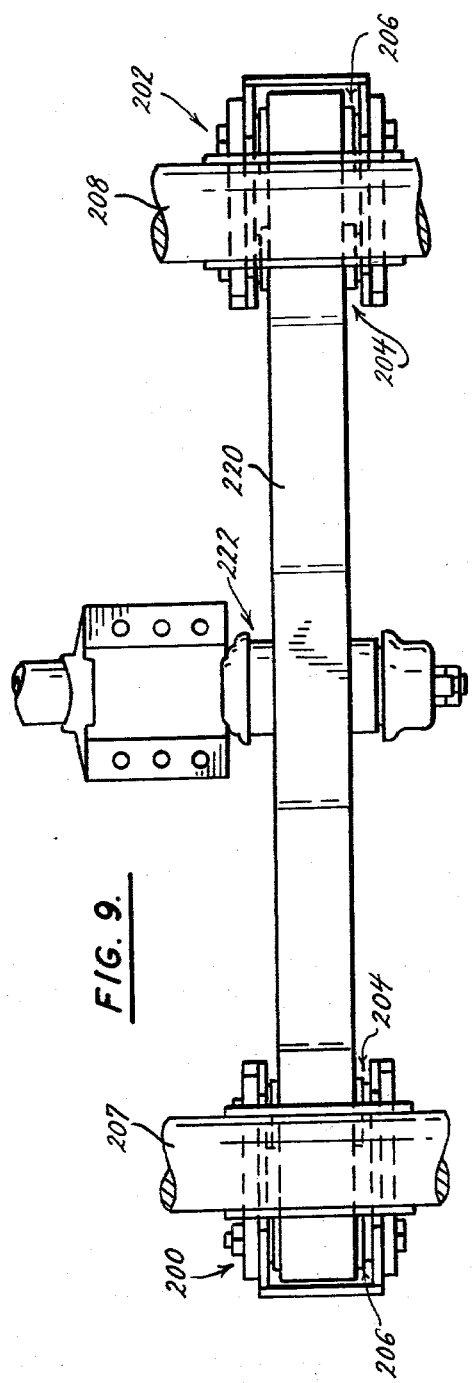
FIG. 9 is a plan view of still another tandem suspension assembly of the solid beam type using the mounting structure of the present invention for mounting the axle seat.
Figure 10:
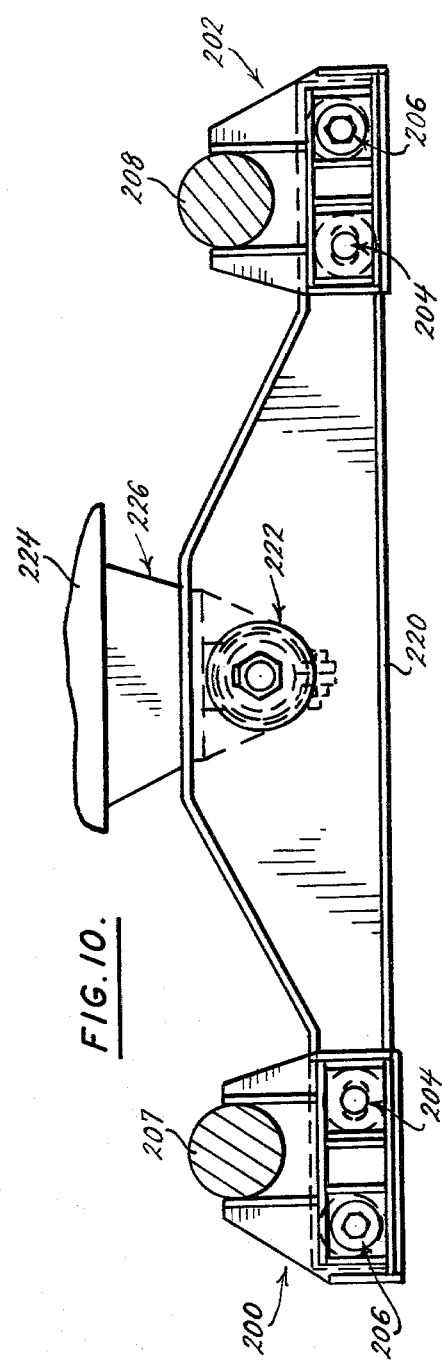
FIG. 10 is a side elevation view of the suspension assembly of FIG. 9.
Figure 13:
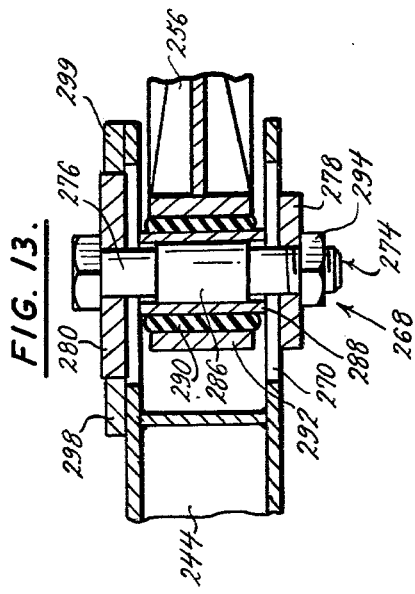
FIG. 13 is an enlarged view in section taken generally along the line 13—13 of FIG. 11.
Figure 12:
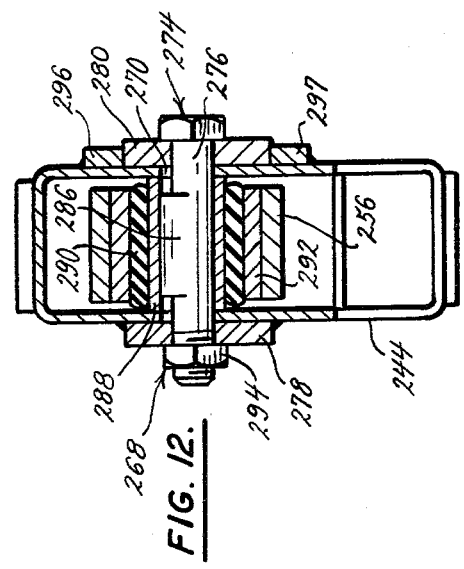
FIG. 12 is an enlarged view in section taken generally along the line 12—12 of FIG. 11; P
Figure 11:
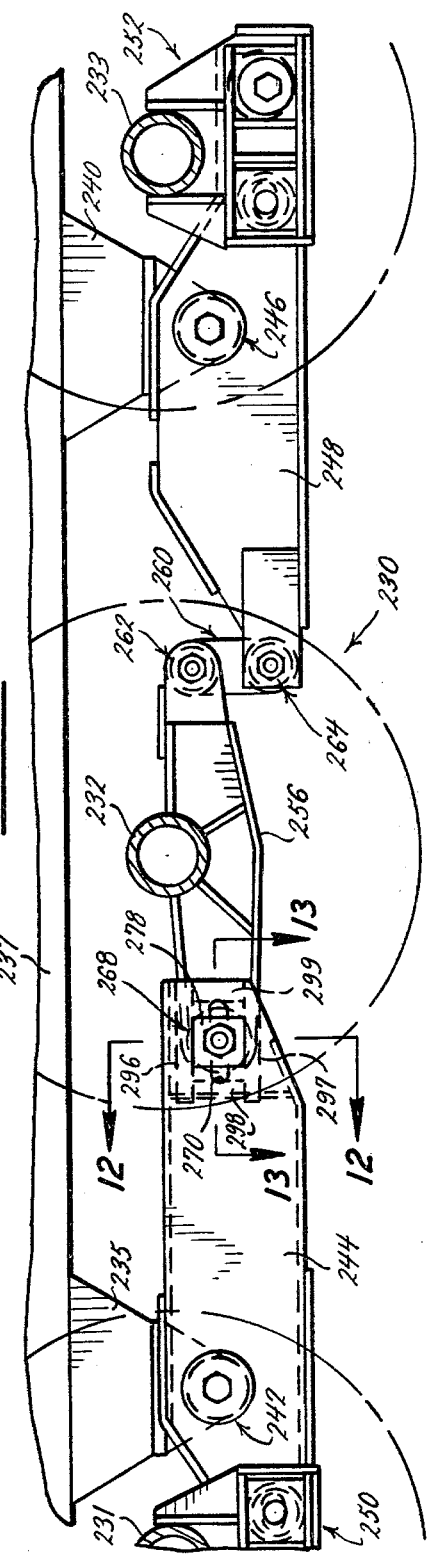
FIG. 11 is a side elevation view of still another suspension assembly of the triaxle type utilizing the mounting structure of the present invention for both mounting the axle seat and between adjacent beams for adjusting axle load distribution.

In describing the various embodiments of the invention it is to be understood that the suspension assemblies described are duplicated at both sides of the vehicle so that the suspension assembly of only one side need by described.

Referring to FIGS. 1 through 7, there is shown a trailing axle suspension 20 including a hanger 22 depending from and supported to the chassis 24 of a vehicle, by means of a mounting bracket 26 and bolts 28. A beam 30 is pivotally mounted to the hanger 22 by means of a bushing assembly 32 at a location intermediate its forward and rearward ends. The forward end of the beam 30, which is of generally I-beam construction, rests on the upper surface of a bearing assembly 34 mounted at the lower end of a shackle 36. Another bearing assembly 38 is mounted at the upper end of the shackle with the rearward end of a leaf spring 40 resting against the lower surface thereof. The leaf spring 40 corresponds generally to the leaf spring 200 of U.S. Pat. No. 3,614,123, the entirety of which is incorporated herein by reference, and resiliently mounts a forward axle to the vehicle as generally shown by the referenced patent. A wear pad 42 is located between the rear of the spring 40 and the bearing assembly 38 to provide a wear surface for movement of the spring relative to the bushing assembly. An axle seat 43 is mounted to the rearward end of the beam 30 and an axle 44 is rigidly mounted thereto.

The shackle 36 includes two parallel plates 46 and 48. the bearing assemblies 34 and 38 each include a bolt 50, the shank of which extends through aligned holes in the plates 46 and 48 and through reinforcing plates 52 and 53. A fiber bushing 58 surrounds the bolt shank. An outer sleeve 60 surrounds the bushing 58, and a nut 62 at the threaded end of the bolt holds the bearing assembly in place. The outer sleeve of the bearing assembly 34 has a top plate portion 64 that engages the lower end of the beam 30. A locating pin 66 extends upwardly from the plate 64 and into a selected one of a series of holes 70 in the lower end of the beam 30. The load distribution between the forward and rearward axles can be adjusted by inserting the pin in a selected one of the holes 70. Similarly, the bearing assembly 38 has a plate portion 72 for engagement with the upper side of the spring 40.

The hanger 22 may be generally of the type disclosed in said U.S. Pat. No. 3,912,294 and generally designated by the numeral 42, and has vertical slots 76 for vertical adjustment of the bushing assembly 32 and beam 30 therein for adjustment of axle height. The bushing assembly 32 may be generally the same as the bushing assembly 95 of the U.S. Pat. No. 3,912,294 and comprises a bolt 80 extending through square blocks 81 and 82 which are permitted to slide but prevented from rotating by hanger flanges at either side of each block. The bolt extends within the slots 76. A metal sleeve 84 is rotatably mounted on the shank of the bolt and a rubber bushing 86 surrounds and is bonded to the sleeve. Another sleeve 88 surrounds the rubber bushing and is secured to and actually a part of the beam 30. The bolt 80 and the entire bushing assembly 32 is tightened in place by a nut 90 at the threaded end of the bolt.

The beam 30 has a generally horizontal forward end 94, a generally horizontal rearward portion 96 and an intermediate portion therebetween that inclines generally forwardly and upwardly within which the sleeve 88 is located. The axle seat 43 is mounted to the rearward end 96 of the beam and its structure and mounting to the beam are primary features of the present invention.

The axle seat 43 comprises parallel plates 100 and 101 having aligned U-shaped slots 102 in which the axle 44 is rigidly secured such as by welding at 103. At each side of the axle are vertical plates 105 to which the axle is welded. Horizontal plates 107 and a vertical end plate 108 extend between the parallel side plates 100 and 101 to hold them in parallel spaced apart relation. below the axle and on the outside surface of each of the plates 100 and 101 are frame members including horizontal frame members 110 and vertical frame members 111.

The axle seat 43 is mounted to the rearward end of the beam 30 for adjustable fore and aft movement and hence alignment of the axle by means of two bushing assemblies 120 and 122. the bushing assembly 122 is eccentric and similar to that disclosed in numerous ones of applicant's issued patents. See for example the eccentric bushing 68 in U.S. Pat. No. 3,801,086. Thus the eccentric bushing 122 comprises a bolt 124 having a hexagon head 125 and a shank 126 which extends through aligned holes in rectangular blocks 127 located outside the parallel plates 100 and 101. the square plates 127 fit within the frame members 110 and 111 so that they, along with the bolt 125, are held in place both vertically and horizontally as the shank of the bolt is rotated. The shank of the bolt also extends through openings 128 in the parallel plates 100 and 101 and has an eccentric portion 130 between the parallel plates. The openings 128 are sized to allow passage of the eccentric portion of the bolt therethrough during assembly, but the bolt is held against the bottom of the openings by the frame members 110 for eccentric adjustment of the axle seat relative to the beam as will be explained. A metalic sleeve 132 surrounds the shank of the bolt between the parallel plates 100 and 101 and a rubber bushing 134 surrounds the sleeve 132 and is bonded thereto. An outer sleeve 136 surrounds the bushing and is also secured to and forms a part of the beam 30. the bolt 124 is tightened by means of a nut 140 at its threaded end and both the hexagon head 125 and haxagon nut 140 may be kept from turning by means of washers 142 which may be tack welded in place against the blocks 127. The washers 142 have a hexagon shaped opening to mate closely with that of the head and nut.

The washers 142 are optional and act only to insure that the bushing assembly does not loosen. These washers are only tack welded so that they can be easily and quickly removed for ready adjustment of the bushing assembly for axle alignment. With the washers removed, adjustment of the axle seat relative to the beam 30 is provided by loosening the nut 140 and turning the eccentric bolt 124.

the bushing assembly 120 is in generally horizontal alignment with the bushing assembly 122 and also includes a bolt 150 having a hexagon head 152 and a shank 153. Unlike the shank of the bolt 124, the shank 153 is not eccentric. The shank 153 extends through square blocks 156 located within the frame members 110 and 111 with the bolt threadedly engaging one of the blocks as at 158. The blocks 156 fit snuggly within but are free to slide horizontally relative to the horizontal frame members 110, and the side edges of the blocks 156 are spaced somewhat from the vertical frame members 111 to allow horizontal movement of the axle seat relative to the beam as will be further explained.

The shank of the bolt also extends through openings 160 in the parallel plates 100 and 101. As shown in FIGS. 2, 4, and 5, the openings 160 are greater in the horizontal axis than in the vertical axis with the vertical axis dimension being approximately equal to the diameter of the shank 153 and the dimension in the horizontal axis being sufficiently great to allow horizontal movement of the axle seat relative to the bolt 150 as the eccentric bolt 124 is rotated.

A sleeve 164 is rotatably mounted about the shank 153 between the parallel plates 100 and 101 and a rubber bushing 166 surrounds and is bonded to the sleeve. An outer sleeve 168 surrounds the bushing, the sleeve 168 being secured to and a part of the beam 30.

Operation

Operation of the axle seat adjustment is evident from the foregoing description. To adjust alignment of the axle, the bolts 124 and 150 are loosened. If the washers 142 are used, the tack welds are first tapped loose and the washers removed. The eccentric bolt 150 is then rotated causing the axle seat to move horizontally relative to the beam 30, this movement being allowed by the sliding of the elongated openings in the parallel plates 100 and 101 relative to the bolt 150. After alignment has been properly adjusted, the bolts 124 and 150 are tightened and if desired the washers 142 may be replaced by tack welding. This mounting arrangement for the axle seat provides precise adjustment for alignment.

The suspension assembly of this embodiment operates in generally the same way as other trailing axle suspensions with the load between the axles being distributed through the shackle arrangement 36. However, in this embodiment the trailing axle is mounted through the rigid beam 30 supported through the bushing assemblies 32, 34, 120 and 122 and the load distribution between the axles is adjustable by the location of the pin 66 in a selected one of the openings 70 at the forward end of the beam.

The Embodiment of FIG. 8

In FIG. 8 there is shown a tandem suspension of the general type described in U.S. Pat. Nos. 3,471,165 and 3,632,128, the entirety of which are incorporated herein by reference. The major differences between the suspension of this embodiment and those of the referenced patents are in the axle seat mountings of the present invention.

A tandem suspension 180 comprises a pedestal 182 depending from and secured to the chassis 184 of the vehicle. The lower end of the pedestal 182 supports a trunnion bushing assembly 186 to which is pivotally mounted a compensator 188. A pair of torque beams 190 and 192 are pivotally connected to the compensator 188 by bushing assemblies 194 and 196. The axes of the bushing assemblies are below the axis of the trunnion bushing assembly 186 as shown. The torque beams 190 and 192 extend forwardly and rearwardly, respectively, to axle seats 200 and 202 and are secured thereto through bushing assemblies 204 and 206. Vehicle axles 207 and 208 are secured to the axle seats. The axle seats 200 and 202 are essentially the same as the axle seat 43 of the first described embodiment, and the bushing assemblies 204 and 206 are essentially the same as the bushing assemblies 120 and 122 of the first described embodiment. Elastomeric springs 210 and 212 are mounted between the compensator 188 and the tops of the torque beams 190 and 192 respectively.

The operation of the suspension assembly of this embodiment is similar to those of referenced U.S. Pat. Nos. 3,471,165 and 3,632,128 by its distribution of load between the two axles through the compensator 188. The difference is in the axle seat mounting which operates in the manner of the first described embodiment for precise alignment of the axles.

THE EMBODIMENT OF FIGS. 9 AND 10

The suspension of this embodiment is similar to that of the second described embodiment but is a solid beam tandem suspension without the elastomeric springs such as the springs 210 and 212. Instead, the axle seats 200 and 202 are mounted directly to the ends of a solid beam compensator 220 which in turn is pivotally mounted through a trunnion bushing assembly 222 supported from the chassis 224 by a pedestal 226. The trunnion bushing assembly 222 is generally the same as the trunnion bushing assembly 186 of the second described embodiment and the trunnion bushing assembly 37 of referenced U.S. Pat. No. 3,632,128 as best shown in FIG. 5 of that patent.

The compensator 220 acts to distribute the load between the axles, and the axle seats 200 and 202 operate in the manner of the first two described embodiments for precise adjustment of axle alignment.

THE EMBODIMENT OF FIGS. 11 THROUGH 13

This embodiment is for a tri-axle suspension similar in many respects to that described in U.S. Pat. No. 3,625,538, the entirety of which is incorporated herein by reference. The major differences between the suspension of this embodiment and that of the referenced patent are in the axle seat mountings and the mountings between the beams.

The tri-axle suspension assembly 230 supports a forward axle 231, a middle axle 232, and a rear axle 233. These axles are supported by a forward pedestal 235 depending from the vehicle chassis 237 at a location just rearwardly of the front axle, and a rear pedestal 240 depending from the chassis and located just forward of the rear axle. The lower end of the pedestal 235 supports a trunnion bushing assembly 242 to which is pivotally mounted a forward oscillating beam 244. The lower end of the rear pedestal 240 supports a trunnion bushing assembly 246 to which is pivotally mounted a rearward oscillating beam 248. The trunnion bushing assemblies 242 and 246 are essentially the same as the bushing assembly 48 as shown in FIG. 9 of the referenced U.S. Pat. No. 3,625,538. A forward axle seat 250 to which the forward axle 231 is rigidly mounted, is connected to the forward beam 244 at a location forward of the trunnion bushing assembly 242, and a rearward axle seat 252 to which the rear axle 233 is rigidly secured is mounted to the rearward beam 248 at a location rearwardly of the trunnion bushing assembly 246. The axle seats 250 and 252 are essentially the same in structure and operation as the axle seats 200 and 202 of previously described embodiments.

A central or walking beam 256 to which the axle 232 is rigidly secured, extends between the rearward end of the beam 244 and the forward end of the beam 248. Unlike the suspension of the referenced U.S. Pat. No. 3,625,538, the rearward end of the walking beam is mounted to the forward end of the beam 248 by a shackle assembly 260 and bushing assemblies 262 and 264 which allow pivotal movement of the beams 256 and 248 relative to each other and relative to the shackle. The bushing assemblies 262 and 264 are essentially the same as the bushing assembly 32 of the first described embodiment.

The forward end of the walking beam 256 is pivotally mounted to the rearward end of the beam 244 by an adjustable bushing assembly 268 which is similar in some respects to the eccentric bushing assembly 105 of referenced U.S. Pat. No. 3,625,538 with reference to FIG. 8 of that patent. A major distinction is that through use of elongated slots 270, the bushing assembly 268 allows for greater adjustability for axle load distribution.

The bushing assembly 268 comprises a bolt 274 with a shank 276 that extends through aligned holes in rectangular blocks 278 and 280 located at the outer surfaces at each side of the beam 244. The shank also extends through the elongated slots in the beam 244 and has an eccentric portion 286 located between the side walls of the beam 244. A metalic sleeve 288 surrounds the shank and eccentric portion between the walls of the beam 244 and a bushing 290 surrounds the sleeve 288. An outer sleeve 292 surrounds the bushing and is secured to the end of the walking beam 256 to form a part thereof. One end of the bolt 274 is threaded and receives a nut 294 for tightening the bolt against the blocks 278 and 280.

It will be noted that the slots 270 in the side walls of the beam 244 are elongated in the horizontal direction and may be approximately one to three inches (2.5 to 7.6 centimeters) long so that the bolt 274 can be made to slide therein for relative horizontal movement of the beams 244 and 256 when the bolt is loosened as allowed by pivotal movement of the beams 256 and 248 at the shackle 260. In this way the relative load distributions between the axles can be quickly and easily adjusted.

The block 280 is framed by horizontal members 296 and 297 at the top and bottom of the block and vertical members 298 and 299 at the sides of the block. The frame members 296 and 297 act as guides for the horizontal adjustment, and the vertical members 298 and 299 may be tack welded in place after the adjustment is completed to hold the bushing assembly in its selected position should the bolt 274 become loose.

There are various changes and modifications which may be made to applicant's invention as would be apparent to those skilled in the art. However, any of these changes or modifications are included in the teaching of applicant's disclosure and he intends that his invention be limited only by the scope of the claims appended hereto.

What is claimed is:

1. In a vehicle suspension assembly, a mounting structure for adjustably mounting a first member to a second member, said mounting structure comprising at least one pin extending through aligned openings in said first and second members, the openings in one of said first and second members being larger in dimension in at least one transverse direction of the pin than the dimension of said pin in that same transverse direction at a location adjacent said larger openings, means releasably locking said pin against transverse movement within said larger openings and at a selected position within said larger openings, and means having a shank extending through said first and second members and having an eccentric shank portion engaging one of said first and second members for adjustably moving one of said first and second members relative to the other in said transverse direction for relative positioning of same at transverse locations of said pin within said larger openings upon rotation of said eccentric shank when said pin is unlocked 2. The mounting structure of claim 1 wherein said eccentric shank is operatively connected with said pin.

3. The mounting structure of claim 1 further comprising a bushing assembly spaced from said pin, said bushing assembly including said shank with said eccentric shank portion.

4. The mounting structure of claim 1 wherein said first and second members are pivotally connected beams of a multiple axle suspension assembly, and wherein said eccentric shank is operatively connected with said pin.

5. The mounting structure of claim 1 wherein said first and second members are an axle seat to which an axle of the vehicle is rigidly secured, and a member operatively connecting the axle seat to the vehicle chassis for movement of the axle relative to the chassis upon loading and unloading the axle, said axle seat being adjustably mounted to said member, and wherein said mounting structure further comprises a bushing assembly spaced from said pin, said bushing assembly including said shank with said eccentric shank portion.

6. The mounting structure of claim 1 further comprising means for releasably locking said shank against rotation.

7. The mounting structure of claim 1 wherein said pin and releasably locking means for said pin is a nut and bolt assembly with means firmly engaging the member having the larger openings when said nut and bolt assembly is tightened to prevent said transverse movement of the pin within the larger openings.

8. The mounting structure of claim 1 wherein said means having a shank further comprises a nut and bolt assembly including said eccentric shank portion, said shank being releasably locked against rotation by tightening of said nut and bolt assembly.

9. In a multiple axle suspension assembly, at least two members operatively connected to the vehicle chassis for pivotal movement relative thereto, and means mounting an axle of said vehicle to each of said members said improvement comprising a mounting structure for adjustably pivotally mounting said first and second members together and for adjustably distributing the load between said axles, said mounting structure comprising at least one pin extending through aligned openings in said first and second members, the openings in one of said first and second members being larger in dimension in the generally horizontal transverse direction of the pin than the dimension of said pin in that same transverse direction at a location adjacent said larger openings, means releasably locking said pin against transverse movement within said larger openings and at a selected position within said larger openings, the pin having an eccentric shank portion operatively engaging one of said first and second members for adjustably moving one of said first and second members relative to the other in said transverse direction at transverse locations of said pin within said larger openings upon rotation of said eccentric shank when the pin is unlocked 10. In a multiple axle suspension assembly, at least three members operatively connected to the vehicle chassis for pivotal movement relative thereto, and means mounting an axle of said vehicle to each of said members said improvement comprising a mounting structure for adjustably pivotally mounting first and second members together and for adjustably distributing the load between said axles, said mounting structure comprising at least one pin extending through aligned openings in said first and second members being larger in dimension in the generally horizontal transverse direction of the pin than the dimension of said pin in that same transverse direction at a location adjacent said larger openings, means releasably locking said pin against transverse movement within said larger openings and at a selected position within said larger openings, the pin having an eccentric shank portion operatively engaging one of said first and second members for adjustably moving one of said first and second members relative to the other in said transverse direction at transverse locations of said pin within said larger openings upon rotation of said eccentric shank when the pin is unlocked, said suspension assembly further comprising a shackle assembly, said shackle assembly having a first bushing assembly for pivotally mounting one of said first and second members thereto and a second bushing assembly for pivotally mounting a third member thereto.

* * * * *